(12) United States Patent
Chisholm et al.

(10) Patent No.: US 10,752,538 B1
(45) Date of Patent: *Aug. 25, 2020

(54) THREE-DIMENSIONAL PRINTING ON GLASS CONTAINERS

(71) Applicant: Owens-Brockway Glass Container Inc., Perrysburg, OH (US)

(72) Inventors: Brian J. Chisholm, Sylvania, OH (US); Cedric Charretton, Saint Symphorien sur Coise (FR); Olivier Dangmann, Villefranche sur Saoue (FR); Eva Misfud, Meys (FR); Susan L. Smith, Rossford, OH (US); Ludovic Valette, Perrysburg, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,414

(22) Filed: Mar. 6, 2019

(51) Int. Cl.
| | | |
|---|---|---|
| *B29C 41/20* | (2006.01) | |
| *B29C 71/04* | (2006.01) | |
| *B41J 2/01* | (2006.01) | |
| *B41M 1/34* | (2006.01) | |
| *C03C 17/32* | (2006.01) | |
| *C03C 17/00* | (2006.01) | |
| *C03B 9/03* | (2006.01) | |
| *C09D 11/101* | (2014.01) | |
| *C03B 9/14* | (2006.01) | |
| *C09D 11/30* | (2014.01) | |
| *C03B 9/193* | (2006.01) | |
| *C03B 9/325* | (2006.01) | |
| *B29D 22/00* | (2006.01) | |
| *B41M 5/00* | (2006.01) | |
| *B29C 64/112* | (2017.01) | |
| *B41J 3/407* | (2006.01) | |
| *C09D 5/00* | (2006.01) | |
| *B29L 31/00* | (2006.01) | |
| *B29C 35/08* | (2006.01) | |

(52) U.S. Cl.
CPC .......... *C03C 17/005* (2013.01); *B29C 64/112* (2017.08); *B29D 22/003* (2013.01); *B41J 3/4073* (2013.01); *B41M 5/007* (2013.01); *B41M 5/0041* (2013.01); *B41M 5/0047* (2013.01); *B41M 5/0082* (2013.01); *B41M 5/0088* (2013.01); *C03B 9/03* (2013.01); *C03B 9/14* (2013.01); *C03B 9/193* (2013.01); *C03B 9/325* (2013.01); *C09D 5/002* (2013.01); *C09D 11/101* (2013.01); *C09D 11/30* (2013.01); *B29C 2035/0827* (2013.01); *B29L 2031/7158* (2013.01)

(58) Field of Classification Search
CPC ............ B29C 2035/0827; B29C 41/20; B29C 64/112; B29C 71/04; B29D 22/003; B29L 2031/7158; B41J 2/01; B41J 3/4073; B41M 1/34; B41M 5/0041; B41M 5/0047; B41M 5/007; B41M 5/0082; B41M 5/0088; B41M 7/0081; C03B 9/14; C03B 9/325; C03C 17/005; C03C 17/32; C09D 5/002; C09D 11/101; C09D 11/30
USPC .................. 264/80, 129, 255, 259, 308, 494; 65/60.1, 66, 117, 120

See application file for complete search history.

(56) References Cited

U.S. PATENT DOCUMENTS

| | | | |
|---|---|---|---|
| 3,004,875 A | 10/1961 | Lytle | |
| 3,922,450 A * | 11/1975 | Stengle, Jr. ............. | C03C 17/32 428/34.7 |
| 3,948,171 A | 4/1976 | O'Connell | |
| 3,999,509 A | 12/1976 | Lucas | |
| 4,065,590 A | 12/1977 | Salensky | |
| 4,086,373 A | 4/1978 | Tobias et al. | |
| 4,290,533 A | 9/1981 | Rupp et al. | |
| 4,324,815 A | 4/1982 | Mitani et al. | |
| 4,673,609 A | 6/1987 | Hill | |
| 4,958,560 A | 9/1990 | Collins | |
| 5,388,509 A | 2/1995 | Cutcher | |
| 5,390,595 A | 2/1995 | Cutcher | |
| 5,458,682 A | 10/1995 | Stulpin et al. | |
| 5,686,188 A | 11/1997 | Brandt et al. | |
| 5,766,709 A | 6/1998 | Geddes et al. | |
| 5,985,376 A | 11/1999 | Kamen | |
| 6,075,223 A | 6/2000 | Harrison | |
| 6,283,022 B1 | 9/2001 | Kamen et al. | |
| 6,312,790 B1 | 11/2001 | Kutilek | |
| 6,797,324 B2 | 9/2004 | Pollara | |
| 7,354,072 B2 | 4/2008 | Yokote et al. | |

(Continued)

FOREIGN PATENT DOCUMENTS

| | | |
|---|---|---|
| CN | 201099655 U | 8/2000 |
| DE | 102013111378 A1 | 4/2015 |

(Continued)

OTHER PUBLICATIONS

Legal Status Table for Japanese Application No. JP20030207278, Application Date: Aug. 12, 2003, Publication No. JP2004130779 A2, Years 2004 to 2016, Date: Jul. 7, 2016.

*Primary Examiner* — Leo B Tentoni (57) ABSTRACT

This disclosure describes substrate(s) formed with a three-dimensional (3D) feature thereon, and method(s) of printing the same. One method includes identifying a plurality of locations on a substrate surface where the three-dimensional feature will be formed, determining a height value of the three-dimensional feature at each location, assigning a grayscale value to each location based on the height value, and applying ink to the substrate surface at each location according to the assigned grayscale value.

27 Claims, 7 Drawing Sheets

(56) References Cited

U.S. PATENT DOCUMENTS

| | | |
|---|---|---|
| 8,679,599 B2 | 3/2014 | Grzybowski et al. |
| 8,784,932 B2 | 7/2014 | Hill et al. |
| 8,991,211 B1 | 3/2015 | Arlotti et al. |
| 9,061,521 B2 | 6/2015 | Olson et al. |
| 9,117,159 B2 | 8/2015 | Davidson |
| 9,221,275 B2 | 12/2015 | Till |
| 9,248,623 B2 | 2/2016 | Pettis et al. |
| 9,938,185 B2 | 4/2018 | Remington, Jr. et al. |
| 2003/0026460 A1* | 2/2003 | Conrad ............... G06T 7/507 382/114 |
| 2007/0157559 A1 | 7/2007 | Till |
| 2007/0256455 A1 | 11/2007 | Berden et al. |
| 2007/0259140 A1 | 11/2007 | Marlow |
| 2008/0138536 A1* | 6/2008 | Herlihy ............... C09D 11/101 427/596 |
| 2009/0304948 A1 | 12/2009 | Witter et al. |
| 2010/0221504 A1 | 9/2010 | Bauer |
| 2011/0003102 A1 | 1/2011 | Hou et al. |
| 2011/0157272 A1* | 6/2011 | Ikehata ............... B41J 2/2114 347/16 |
| 2011/0274891 A1* | 11/2011 | De Rossi ............ B41M 5/0047 428/195.1 |
| 2013/0074765 A1 | 3/2013 | Heylen et al. |
| 2013/0248528 A1 | 9/2013 | Fushimi |
| 2014/0001181 A1 | 1/2014 | Sharma et al. |
| 2014/0116911 A1 | 5/2014 | Bryant |
| 2014/0283980 A1 | 9/2014 | Lee |
| 2015/0002567 A1 | 1/2015 | Miller |
| 2015/0056415 A1 | 2/2015 | Southard |
| 2015/0093552 A1 | 4/2015 | Biskop et al. |
| 2015/0258770 A1 | 9/2015 | Chan et al. |
| 2015/0266334 A1 | 9/2015 | Dalisay et al. |
| 2015/0352783 A1 | 12/2015 | Snyder et al. |
| 2016/0083135 A1 | 3/2016 | Fushimi |
| 2016/0136901 A1 | 5/2016 | Pettis et al. |
| 2016/0136982 A1* | 5/2016 | Heath ............... B41J 3/4073 347/5 |
| 2016/0243814 A1 | 8/2016 | Schaefer et al. |
| 2017/0341304 A1 | 11/2017 | Miller |
| 2018/0110250 A1* | 4/2018 | Popplewell ........... B29C 64/112 |
| 2018/0116907 A1 | 5/2018 | Fadeev et al. |
| 2018/0230041 A1 | 8/2018 | Remington, Jr. et al. |
| 2018/0312427 A1 | 11/2018 | Perrót et al. |

FOREIGN PATENT DOCUMENTS

| | | | |
|---|---|---|---|
| EP | 0307807 B1 | 7/1990 | |
| EP | 2168774 A1 | 3/2010 | |
| FR | 2970468 A1 | 7/2012 | |
| JP | 2003122262 A | 4/2003 | |
| JP | 2004130779 A * | 4/2004 | ............. B41M 3/06 |
| JP | 2004130779 A | 4/2004 | |
| JP | 2007055150 A | 3/2007 | |
| JP | 4772427 | 9/2011 | |
| WO | WO2015055437 A1 | 4/2015 | |

* cited by examiner

THREE-DIMENSIONAL PRINTING ON GLASS CONTAINERS

CROSS REFERENCE TO RELATED APPLICATIONS

This application relates to U.S. patent application entitled "Three-Dimensional Printing of a Porous Matrix on a Container," filed Mar. 6, 2019, (U.S. application Ser. No. 16/294,434), and U.S. patent application entitled "Repairing an Outer Surface of a Glass Product," filed Mar. 6, 2019, (U.S. application Ser. No. 16/294,441), both which are assigned to the assignee hereof and incorporated herein by reference in their entirety.

TECHNICAL FIELD

This patent application discloses device(s) with and methods to print and/or cure three-dimensional (3D) features. More particularly, this application discloses articles in which the ink-receptive surface for 3D printing and/or curing includes glass.

BACKGROUND

Glass manufacturing is a process to produce glass objects, including glass containers, formed from a wide variety of glass compositions. Glass objects are formed from molten glass that is injected, pressed or blown into a mold, but it is difficult to create sharp, distinct angles, features or undercuts by molding due to the tendency of molten glass to flow and level after removal of the object from the mold, especially in high capacity manufacturing systems in which the object is removed prior to the glass fully hardening. Depending on the complexity of the additional features and the processing conditions required, these molds can be difficult and/or costly to produce, which can limit the shapes and geometries of the final glass product.

Also, certain features such as undercuts, or a negative draft, cannot be molded into the glass object, as such undercut would prevent removal of the mold, as it would be mechanically locked onto the glass object. Also, it is desirable to add flexibility in the manufacture of glass objects to utilize a single mold to produce a glass object without certain features, so that such features can be added to that glass object after removal from the mold, avoiding the cost of having separate molds for each separate type of feature desired. Once formed, the objects may undergo secondary processing to create various additional decorative and/or functional features on the glass surface. Depending on the complexity of the features and the processing conditions required, these molds can be difficult and/or costly to produce, which can limit the shapes and geometries of the final glass product.

Additionally, secondary processing can involve pairing the formed glass object with various secondary components to create the decorative and/or functional features. Often, the secondary components require an additional packaging step or a separable piece that increases the complexity of forming the final glass product.

Another technique to form the additional feature is through the use of screen printing, where ink is applied through a screen or mesh onto the glass. During screen printing, multiple colors may be applied separately and/or the screen can impart ink of a fixed thickness to the glass.

BRIEF SUMMARY OF THE DISCLOSURE

The present disclosure embodies a number of aspects that can be implemented separately from or in combination with each other.

In accordance with one aspect of the disclosure, there is provided a method of printing a three-dimensional (3D) feature on a substrate having a surface that includes the steps of (a) identifying a location or a plurality of locations on the surface where the three-dimensional feature will be formed; (b) determining a height value of the three-dimensional feature at each location; (c) assigning a grayscale value or a numeric scale value from 1 to 100% to each location based on the height value, with the highest height value being 100%; (d) applying UV curable material to the surface in a plurality of layers or in a single layer by varying the density of ink droplets according to the assigned grayscale value at each location, where the material is curable in response to ultraviolet (UV) light; and (e) applying UV light to cure the material, wherein steps (d) to (e) are repeated until the material reaches the respective height value at each location. For purposes herein, the height of the material printed onto the substrate may also be referenced as the thickness of the material printed onto the substrate. For purposes herein, the material may be referred to as a varnish, ink, or varnish containing a colored ink, and these terms may be used interchangeably.

In accordance with another aspect of the disclosure, there is provided a method of printing a 3D feature on a glass substrate using an ultraviolet (UV)-curable varnish, including the steps of (a) applying a layer of UV-curable varnish within a boundary of the 3D feature on a surface of the glass substrate; (b) curing the varnish layer by directing UV light toward the applied varnish layer; (c) based on an assigned grayscale value or numeric scale value, applying one or more additional layers of UV-curable varnish within the boundary of the 3D feature on the surface of the glass substrate; and (d) curing the one or more additional layer of UV-curable varnish by directing UV light toward each additional varnish layer after it is applied. The cured varnish layers can form at least a portion of a surface contour of the glass substrate.

BRIEF DESCRIPTION OF THE DRAWINGS

The disclosure, together with additional objects, features, advantages and aspects thereof, will be best understood from the following description, the appended claims, and the accompanying drawings, in which:

DETAILED DESCRIPTION

Due to the delicate nature of glass substrates (e.g., glass containers), they are often sensitive to scratches, cracks, bubbles, and other similar commercial variations formed during the manufacturing process. After formation, glass containers undergo inspection to select out any containers that possess a commercial variation or impurity. After inspection, various secondary processing steps further impart a wide variety of features to the containers. For example, some glass containers are outfitted with a label after manufacturing. Many glass containers undergo secondary processing that adds decorative and/or functional elements to the container before use.

Additive manufacturing and 3D printing are methods to form additional features on a container after manufacturing using, for example, a digital inkjet printer, a printer extruder, an additive manufacturing machine, or the like. Additive manufacturing can include using a digital model of a desired object to be printed that is generated using known software, for example, ProEngineer or the like. This digital model can be "sliced" or subdivided into thin layers, each of which is subsequently printed and/or formed to create a 3D object. Because the digital model can have any size, shape, or feature desired, the corresponding 3D object created can be equally diverse in terms of its size, shape, features, and the like. It is possible to create three dimensional structures having geometries that are not feasible and/or otherwise possible through other types of manufacturing, including welding various parts together. The final geometry created can be a single monolithic structure that does not include any welds, seams, or other joined areas between parts. It will be appreciated that the final geometry can include various parts that are not additively manufactured and/or are not part of the single monolithic structure. These parts can be formed using traditional manufacturing techniques, such as cutting and/or welding, while other parts are additively manufactured using the material build up process.

While the above 3D model can be utilized in additive manufacturing of the corresponding 3D object, 2D grayscale values associated with the 3D object can also be used with 3D printing to print and form the 3D object. The 2D grayscale values can be used to control the amount of ink, and thus, the height of material printed at a specific location when forming the 3D object. For example, while 3D printers can apply different shades and/or colors of ink based on darkness and/or color needed in a particular area, it is also possible to apply more ink (i.e., to form a greater height or thickness) in specific locations of the final product that are associated with a darker or higher grayscale value and less ink to specific locations of the final product that are associated with a lighter or lower grayscale value. As a result, the 3D printer can print more layers of ink (e.g., ink buildup) and/or larger ink droplets onto the surface of a substrate or container that is associated with a darker grayscale value. The ink droplets can also have different shapes, sizes, spatial densities, and the like with respect to each other and/or in different areas of the surface to which they are applied. Utilizing additive manufacturing and/or 3D printing of features onto glass containers can facilitate light-weighting (e.g., less material is used for portions of the containers), which can support sustainability initiatives and improve line performance speed.

The material used in the printing process can possess a wide variety of compositions and components. For example, it can include a varnish that can be ultra-violet (UV) light curable so that the application of UV light cures or solidifies the material in place on the container. The material can include various polymers, colors (e.g., CMYK process colors), additives, finishes, and the like to style and/or protect the container. If desired, the ink can also closely resemble glass, having a similar feel and being similarly transparent to visible light. The ink can also be translucent, for example, with only the varnish applied. Of course, the material can also appear very different from glass; it can be opaque or translucent to create a contrast between the substrate or container and the material. Further, the material can include organic and/or inorganic components, such as an oligomer, monomer, polymer, polyester, polycarbonate, epoxy, urethane, silicone, styrene, vinyl, nylon, acrylic, acrylate, diacrylate, triacrylate, tetraacrylate, pentacrylate, allylic monomers, multifunctional acrylate oligomer, mutilfunctional acrylate monomer, monofunctional acrylate monomer, acrylated polyester, acrylated epoxy, acrylated urethane, acrylated silicone, acrylated polyester, acrylated oils, thiolenes, plasticizing diluents, acrylonitrile butadiene styrene, acrylonitrile styrene acrylate, co-polyesters, fluorinated ethylene propylene, ethylene acrylic acid, polyetherimide, polypropylene, polylactic acid, polyethylene co trimethylene terephthalate, polyethylene terephthalate modified with glycol and various photoinitiators, additives and pigments.

In addition to setting the grayscale value of the printing process and/or the type of ink, various other printing parameters can be selected before applying the ink. For example, a method of printing can include setting the position of the substrate or container with respect to the printer, setting the printing speed, and/or setting various parameters of ink curing. For example, the method can include setting the rotation speed of the container between 100 mm/second and 400 mm/second and pinning of the layers with an 8 watt LED UV light between 10% and 100% power.

The ink may be deposited in various layers, and each layer can be composed of different compositions and components. For example, if the desired final object is translucent, each layer may be cured after being applied. Because various objects can be formed on the glass container surface, and the ink used to create the objects can have a wide variety of chemical compositions, this method imparts great flexibility and ease to the secondary processing of containers. Additionally, because this process can be performed after manufacturing and inspection, it can increase the efficiency (or at least not further decrease the efficiency) of the useable containers produced.

In some cases, the larger ink droplets can be a combination of smaller ink droplets. In this example, the printer emits ink droplets as dictated by the grayscale value assigned. As the ink droplets are dispensed by the printer, the smaller ink droplets combine in the air on the way to the print surface to form larger droplets. The printer can emit a series of small ink droplets that combine to form a larger droplet, which is different than smaller dots building on the surface to make larger dots. In the grayscale concept, if more ink is needed, the software can determine when to combine dots to move from one gray level to the next.

Figure 1A:
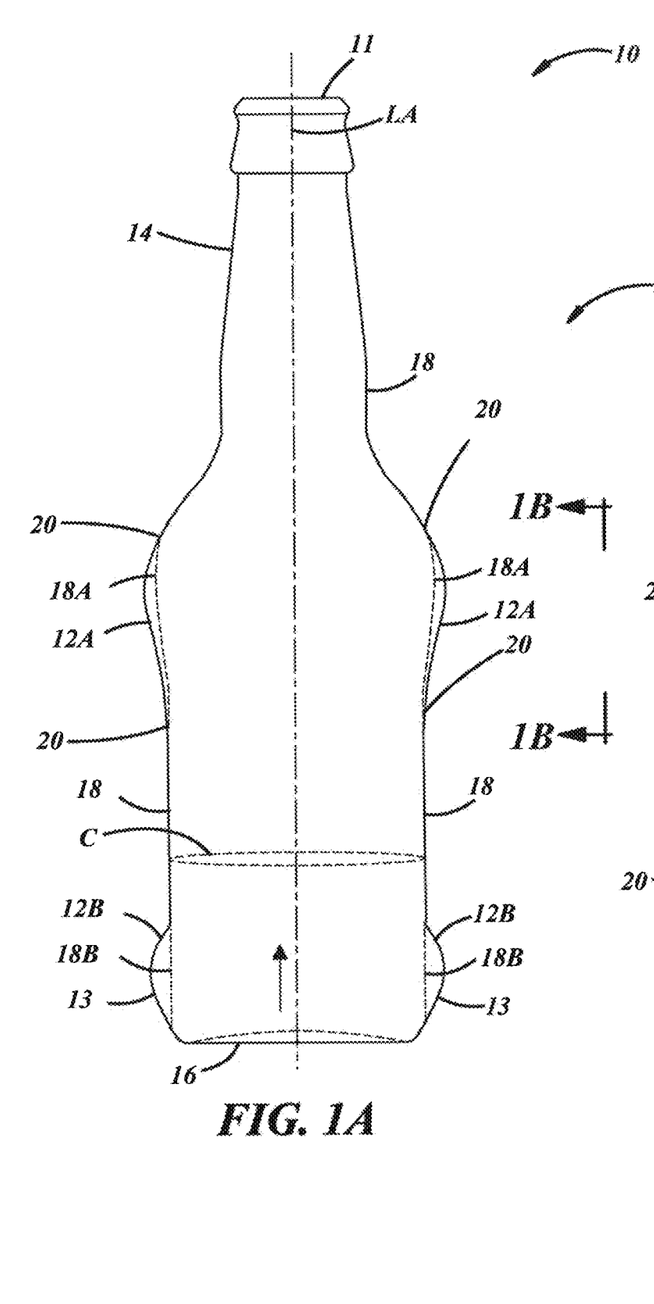
FIGS. 1A-D depict a container with 3D feature(s) thereon.
Figure 1B:
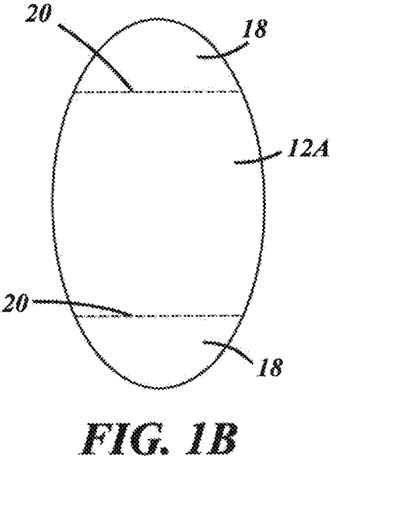

To further illustrate this process, FIG. 1A depicts a container 10 having a bottom 16 and a mouth 11. The container 10 has a body 14 extending in a direction away from the bottom 16 along a longitudinal axis LA. One exemplary direction is depicted with the lower arrow aligned with the longitudinal axis LA in FIG. 1A. The body 14 extends to the mouth 11. While the container 10 shown in the figures are similar to a traditional beer or soda bottle, it will be appreciated that the container 10 could have any shape or size desired. It will be appreciated that the container 10 could also be a glass substrate, such as a solid glass with a flat or planar surface. The body 14 has a surface 18, being an outward surface of the container 10. The container 10 depicts two separate 3D features 12 on the body 14. The first 3D feature 12 can include a shoulder element 12A printed on surface 18A having a fragmentary side view 1B-1B, which is depicted further in FIG. 1B and may not be shown to scale. The shoulder element 12A can be formed in a shoulder area of the container 10. The dotted lines in FIG. 1B outline a boundary 20 between surface 18 and surface 18A, where the shoulder element 12A is printed on surface 18A of the container 10.

Figure 1C:
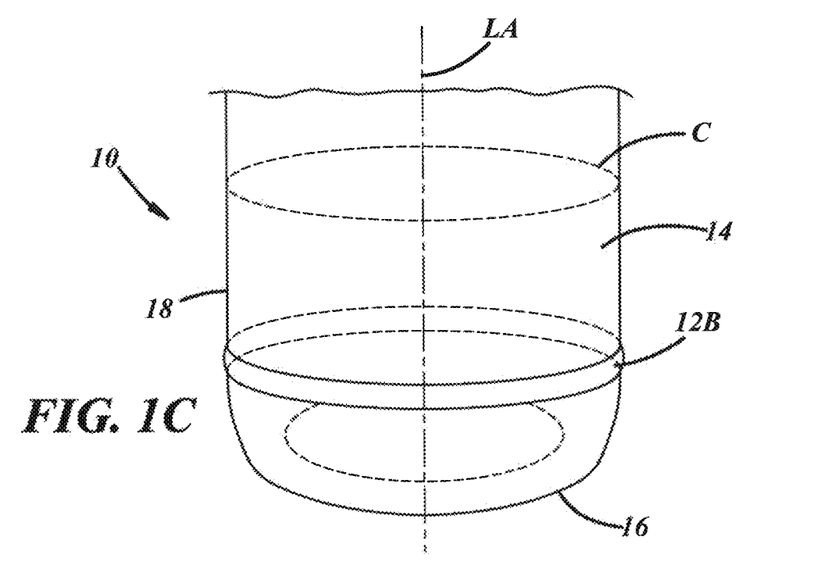

The second 3D feature is a lower contour 12B. This lower contour 12B can be a bumper to prevent damage during transport, sale and/or handling or other use of the container. This lower contour 12B can also assist in racking the containers, and/or have decorative elements thereon. The dotted lines in FIG. 1A located adjacent to the depicted features 12 illustrate the original outline or height of the exterior surface 18B of the glass container 10 before the addition of the 3D features shown. In this example, the shoulder element 12A of the glass container has a diameter or circumference that is greater than a diameter or circumference C of a body of the glass container. The shoulder element 12A and the lower contour 12B may be fully circumferentially continuous around the surface 18 of the body 14. FIG. 1C further illustrates an embodiment of a portion of a container 10 having a fully circumferentially continuous lower contour 12B in the form of a bumper formed on the surface 18 and near the bottom 16.

Figure 1D:
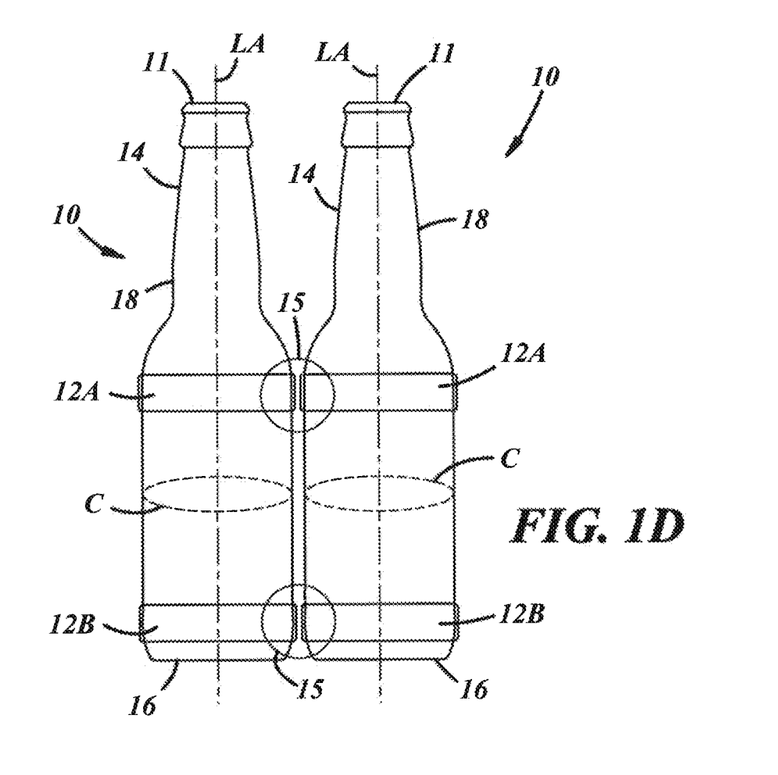

On production and packaging lines, transport and in normal use, glass containers may contact each other primarily at the "contact points" of the heel and shoulder of the container. Commercial variations, which may be damage or defects of any type including chips, scratches, cracks, and nicks, that may be created at these locations due to collisions during handling that negatively impact the strength or the appearance of the container. In the embodiment illustrated in FIG. 1D, multiple containers 10 are shown contacting each other, where each container 10 includes the shoulder element 12A and the lower contour 12B in the form of bumpers. The bumpers can be disposed at contact points 15 that represent a location on the container 10 that may contact another container during a production or packaging process and/or during normal use. The shoulder element 12A and the lower contour 12B can comprise a UV-cured ink, varnish, and/or polymer that can include elastic properties or can add lubricity between each container 10 or it can add both elastic and lubricity between each container 10. By adding the shoulder element 12A and the lower contour 12B at the contact points 15 on each container 10, a reduction in container breakage occurs due to the elastic properties or the added lubricity of the shoulder element 12A and/or the lower contour 12B. Also, adding lubricity improves the transport of the containers 10 on a conveyor belt such that the containers slide past each other and do not collide or cause jams in the equipment.

The ink may be applied in very thin layers only to the largest diameter portions of a container surface, that is, any protrusions from the surface, to add lubricity and/or an elastic coating to such protrusions to protect them from damage caused by collisions of such protrusions during conveyor transport of the containers. These thin layers may be less than 15% on the grayscale.

Additionally, less glass may be used for forming the container 10 when the container 10 includes at least one 3D feature 12. This reduction in glass results in a lighter weight container with added strength at the contact points 15 due to features added via this process. Because each 3D feature 12 can be formed with an elastic material (e.g., a UV-cured polymer) that can absorb impact from other containers, at least a portion of the container 10 can be made thinner than usual. In some embodiments, the reduced thickness of the container 10 can be consistent for the whole container 10. In some embodiments, a specific portion of the glass wall of the container 10 may be reduced. For example, the body 14 of the container 10 disposed between the shoulder element 12A and the lower contour 12B may be of thinner wall thickness (e.g., 0.045 inches) than the shoulder element 12A and/or the lower contour 12B. In implementations, the glass wall thickness of the container 10 may be from about 0.045 inches to about 0.080 inches. It will be appreciated that the glass wall thickness may include other thicknesses. A greater circumference of the shoulder element 12A and the lower contour 12B creates contact points 15 on the container 10 at the shoulder and heel, which absorb impact from other containers during processing and packaging. The body 14 can be thinner because it is not a contact point and does not absorb impact due to its smaller circumference. It is contemplated that various portions of the container 10 can be configured to be formed thinner and/or with a smaller circumference than the remaining portion of the container 10. Through a combination of 3D feature 12 location and choice of material used to form the 3D feature 12, a significant improvement in impact strength and filling line performance can be achieved.

It will be appreciated that even though the surface 18 is outward, the 3D feature could also be formed on an interior or inner surface of the container.

Figure 2A:
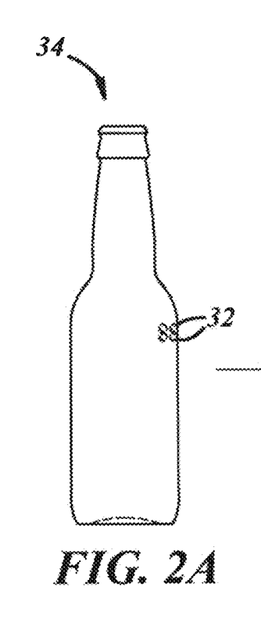
FIGS. 2A-F depict steps of a method of printing a 3D feature on a container.
Figures 2B, 2C:
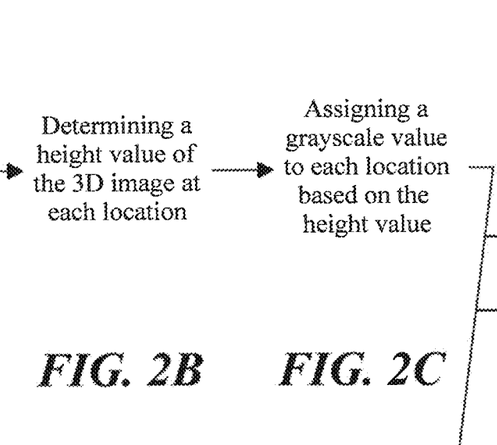

FIGS. 2A-F depict various steps of a method 34 of printing a 3D feature 12 on the container 10. In step 2A, the method includes identifying a plurality of locations (e.g., locations 32) on the container surface where the 3D feature will be formed. These locations 32 are located within the boundary 20 (depicted in FIG. 1B). Once the locations 32 for the 3D feature are selected, the method includes determining a height value of the 3D feature at each location. Each location will have a different height value associated with it, depending on how high or tall the 3D feature should be along the container surface 18. This is depicted in FIG. 2B. In FIG. 2C, the method includes, next, assigning a grayscale value to each location based on the height value. The height at each respective location will be formed by the amount of ink (e.g., the number of layers and/or size of ink drops) deposited by the printer at that location. A higher feature means that more ink is deposited at that location 32.

At some point in the method before printing, the method may also include flame treating the container 10. Flame treating the container 10 can alter the surface or location 32 where the ink and/or primer will ultimately be applied by increasing its surface energy and/or creating polar sites in order to form a stronger bond between the surface or location 32 and the ink or a primer. Additionally, silanization may be used, in which the container 10 is exposed to a silicon-containing compound to form organofunctional alkoxysilane molecules on the container 10 that form a strong bond with the ink or primer. For example, silane (e.g., Pyrosil) can be applied with propane or natural gas as an additive to a gas mixture. The gas mixture can be applied to the glass surface of the container 10 when the glass is at ambient temperature. The glass can reach about 70° C. (e.g., 60° C. to 80° C.) during flaming.

Additionally, before printing the ink, the method may include application of a primer (e.g., Marabu Brue Primer) onto the container's surface or location 32. Similar to the flame treatment described above, the primer can assist in or strengthen bonding the ink to the container 10.

In the glass manufacturing process, a "hot-end" of the container forming process may include one or more melting furnaces, forming machines, and/or beginning portions of an annealing lehr, and a "cold end" may include an end portion of an annealing lehr, inspection equipment, and/or packaging machines. Damage to the glass containers may occur during any of these manufacturing processes and also when containers are being filled with product, when closures are applied, and when the filled, sealed containers are packaged for shipment because the glass containers may bump and otherwise contact each other when moved, for example, on a conveyor. At least one coating, for example, a hot-end coating (typically a tin material) and/or a cold-end coating (typically a poly material), may be applied to the containers for improving lubricity and durability during these processes. The cold-end coating may include, for example, Duracote or Polyglas EA79 AP5 and may be ethylene-based, modified ethylene materials, or stearate materials. Typically, the hot-end coating is applied to the glass surface to provide a primer or basecoat to improve adhesion of the cold-end coating onto the glass surface. Without the hot end coating, the cold end coating would not function properly. However, in some implementations, the glass container 10 may not include a hot-end coating and/or a cold-end coating when at least one 3D feature 12 (e.g., a bumper, a wholly coated container) is formed and/or printed on the glass container 10. The 3D feature 12 can serve to protect the container 10 during the further processing, filling and transport due to its elastic and/or lubricity properties. Because the addition of a 3D feature 12 or applying a thin coating on the large diameter protrusions of the container surface can provide lubricity or protect the glass container 10 during processing and handling, the traditional hot-end and/or the cold-end coatings may not be needed, and those traditional coatings may be eliminated, saving processing time, expense, and eliminating potential environmental emissions issues.

Figure 3A:
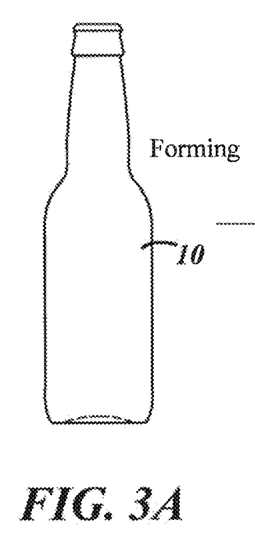
FIGS. 3A-C depict steps of a method of printing a 3D feature on a container without a hot end coating.
Figure 3B:
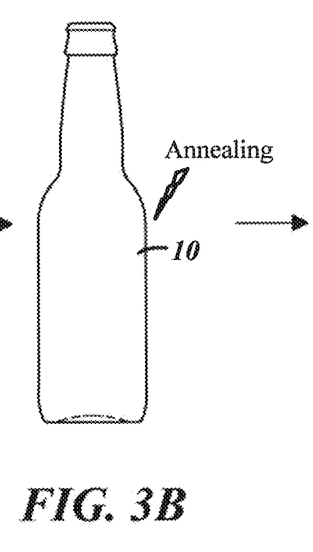
Figure 3C:
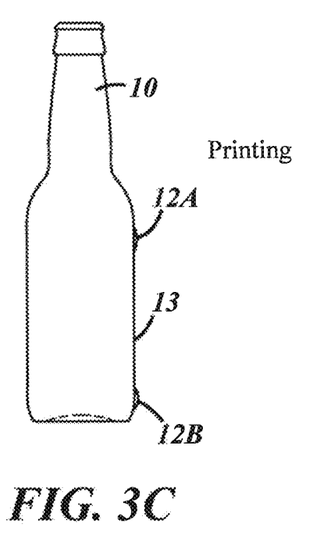

FIGS. 3A-3C illustrate a process for printing a three-dimensional feature on a lubricious glass container 10 without the hot end coating and/or the cold end coating. The process can include forming the glass container 10, for example, using a blow-and-blow or a press-and-blow forming process. It is contemplated that forming the glass container 10 can include other forming processes. Additionally, the process can include annealing the glass container 10 in a lehr, for example, without bottle-to-bottle contact, which avoids scratching or otherwise damaging the glass container 10. At the discharge of the lehr or other annealing equipment, the process can include printing at least one layer of varnish and/or ink on at least a portion of the glass container 10. In one instance, the at least one layer of varnish/ink can be applied to the whole container surface. In another instance, the at least one layer of varnish/ink can be applied to only predetermined contact areas on the glass container 10 (e.g., a shoulder 12A, a lower contour 12B, and the like). The applied varnish and/or ink can be formulated to provide the lubricity needed for suitable performance as well as suitable printing quality/performance. In some implementations, material additives, for example ethylene acrylic acid, may be added to the glass container 10 and/or to the varnish/ink to enhance adhesion and compatibility with other chemistries in the process. In additional steps, the process may include inspecting the glass container 10 and/or decorating the glass container 10.

Figure 4A:
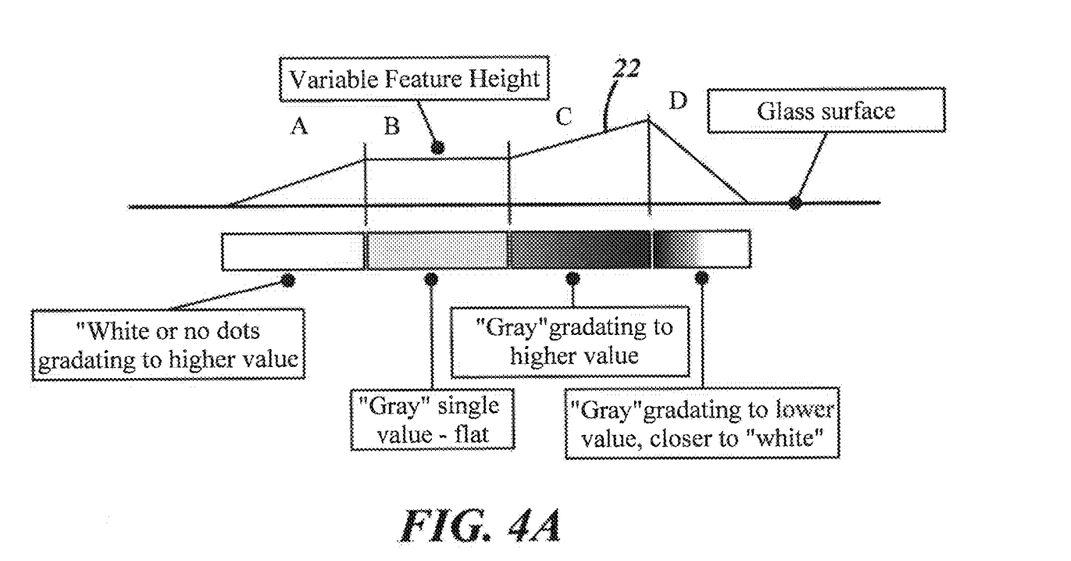
FIGS. 4A-B depict height values associated with respective locations on a substrate.
Figure 4B:
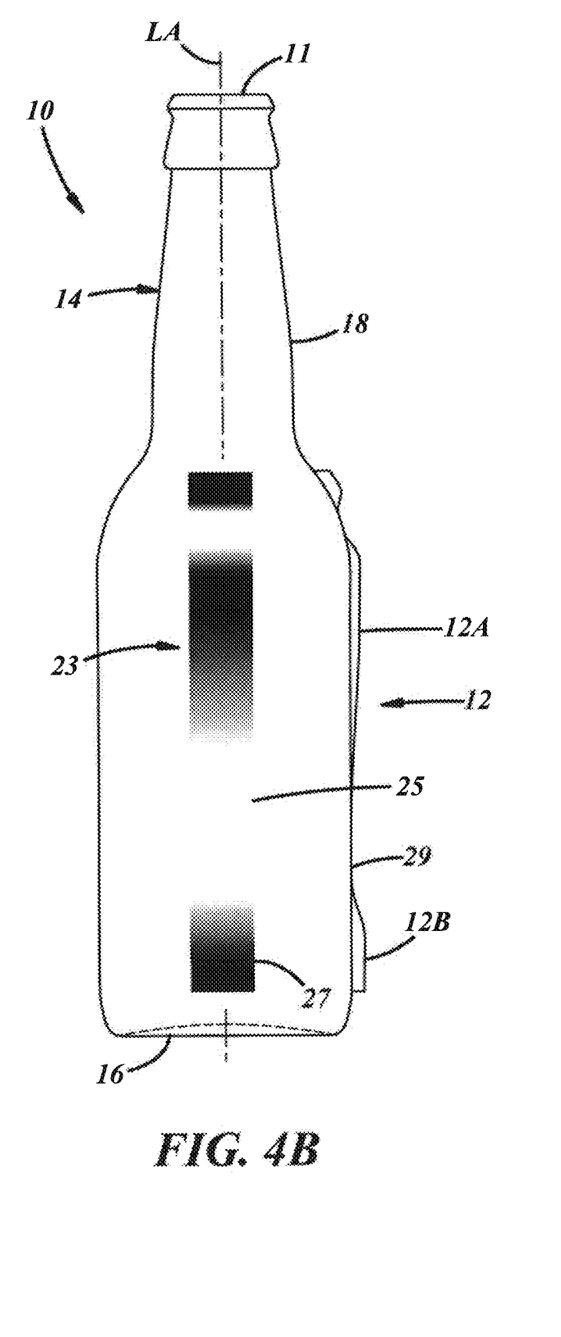

FIGS. 4A and 4B depict how a higher 3D feature relates to an increase in ink as determined by the grayscale value assigned to each location. In FIG. 4A, line 22 represents the height of a glass substrate surface or glass container surface in combination with printed ink or other material. Proceeding along line 22 in area A, the glass surface has no ink added to increase the height. In this location, the grayscale value is "white" and no ink dots have been added to the glass surface by the printer. Midway through area A, the printer starts to deposit ink on the glass surface, increasing the height. In area B, the height value is constant, and ink is added based on this constant height value, indicated with a grayscale value of "gray." This value of "gray" is merely illustrative of this concept. It will be appreciated that more specific grayscale values, including those with exact percentages of ink, could be utilized to form more complex shapes.

In area C, the height again increases to a higher value, indicated with a grayscale value of a darker gray. Finally, in area D, the printer gradually applies ink from a higher height value back to the lowest height value, or "white." This variation in height values and the amount of ink applied to different locations on the surface forms a 3D feature having a unique contour or profile. As is apparent with FIG. 4A, the lightest grayscale value is assigned to the smallest height value, "white" or no ink, and the darkest grayscale value is assigned to the largest height value, "black" or most ink.

FIG. 4B illustrates another example of how varying heights of a 3D feature 12 correspond to grayscale or numeric scale values. As shown in FIG. 4B, a container 10 includes a feature 12 printed on the surface 18, where the feature 12 includes a shoulder 12A (e.g., a bumper) and a lower contour 12B (e.g., a bumper). A depiction 23 of a set of grayscale values is shown, where the darkest grayscale values correspond with the thickest portions of the feature 12. In the example in FIG. 4B, a dark portion 27 of the depiction 23 corresponds to lower contour 12B, and a light/white portion 25 of the depiction 23 corresponds to a portion 29 of the feature 12 between the lower contour 12B and the shoulder 12A. Because the dark portion 27 is dark, the lower contour 12B is formed higher and/or thicker than the portion 29, which corresponds to a light/white portion 25. In the embodiments shown in FIGS. 4A and 4B, each layer of ink/material may extend circumferentially around the surface 18 of the container 10 and may be individually UV-cured before an additional layer is applied.

Figure 2D:
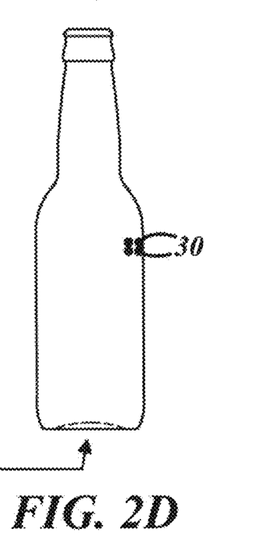
Figure 5A:
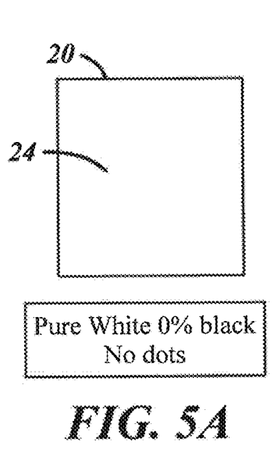
FIGS. 5A-C depict grayscale values of various locations on a substrate.
Figure 5B:
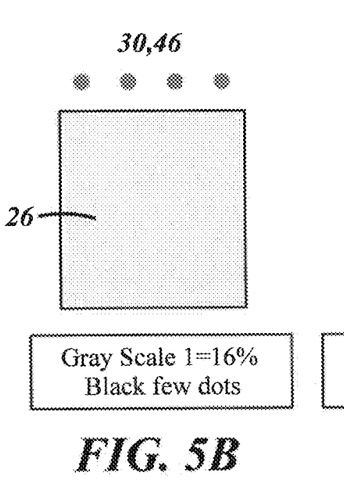
Figure 5C:
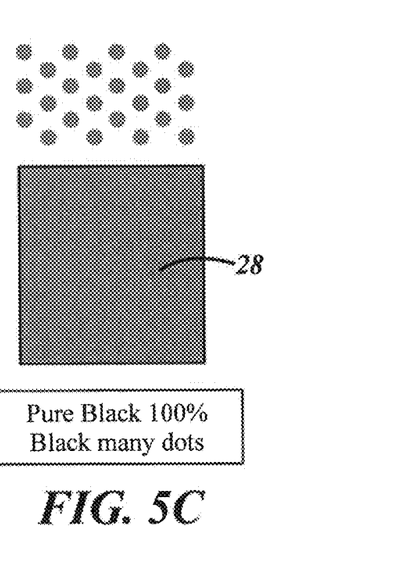

Once the printer assigns a grayscale numeric value, the method includes applying ink to the surface at each location according to the assigned grayscale or numeric value. Returning to FIG. 2D, a plurality of ink drops 30 are applied to the container surface at the respective location. FIGS. 5A-C depict the ink drops 30 in further detail. Within the designated boundary 20, the lightest grayscale value 24 (e.g., white, 0% black ink) is formed so no ink is deposited in this area, as shown in FIG. 5A. In FIG. 5B, a medium grayscale value 26 (e.g., gray, 16% black ink) is formed by applying ink 46 in the form of drops 30 and in a single layer. Finally, the darkest grayscale value 28 (e.g., 100% black ink) is formed by applying the most ink drops 30 possible in the given location; ink may also be applied at that location in a plurality of layers.

It will be appreciated that the assigned grayscale value or drop density directs the height or thickness of the 3D features regardless of whether the ink used is actually gray in color and/or appearance or not. Even though the grayscale value can range from 100% white to 100% black, the actual color of the ink deposited could be any color or it could be a colorless, transparent varnish. The grayscale value indicates the amount of ink, not necessarily its color. In the event that the ink used does form a gray color on the exterior surface of the glass container, this is not equivalent to using grayscale values in the printing process to determine the thickness of the 3D feature.

The type of printer used can be any type generally known in the art. For example, the printer can have a variety of print heads to emit the ink, and a variety of storage reservoirs for the ink. Additionally, the printer will have a chamber containing a support medium and an open space for housing the substrate or container during printing. The printer can either have or be connectable to a UV light source for curing the ink after its application. In some instances, the printer may be selectively coupled to a computer or processor that runs the corresponding software to direct printing of the desired 3D feature. The processor can be any type of device capable of processing electronic instructions including microprocessors, microcontrollers, host processors, controllers, and application specific integrated circuits (ASICs).

Figure 2E:
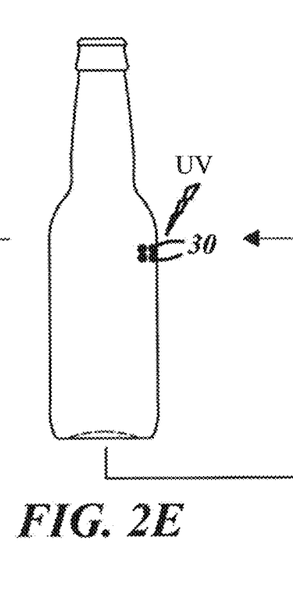

Returning to FIG. 2E, the ink drops 30 are cured with UV light. If the ink is applied in a single layer, UV light cures and/or solidifies the ink after the single layer is applied. If the ink is applied in a plurality of layers, UV light can cure and/or solidify each layer immediately after its application. In this case, the method includes repeating the steps depicted in FIGS. 2D-E until the ink drops 30 reach the respective height value assigned in each location.

Figure 2F:
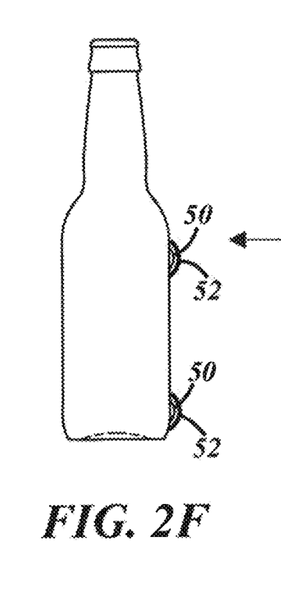

For example, a method of the present disclosure includes (a) applying a layer of UV-curable varnish within a boundary of a 3D feature on a surface of the glass substrate or container; (b) curing the varnish layer by directing UV light toward the applied varnish layer; (c) based on an assigned grayscale value, applying one or more additional layers of UV-curable varnish within the boundary of the 3D feature on the surface of the glass substrate; and (d) curing the additional layer(s) of UV-curable varnish by directing UV light toward the applied varnish layer, wherein the cured varnish layers form at least a portion of a surface contour of the glass substrate. This method includes applying the varnish in a plurality of layers and curing each layer immediately after it is applied until the desired surface contour is formed. FIG. 2F depicts a plurality of layers (e.g., layers 50, 52) forming or creating the feature having a surface contour. Although only two layers are shown in FIG. 2F, it will be appreciated that any number of ink layers can be deposited until the respective height value is achieved. Additionally, the layers 50, 52 may not be shown to scale in FIG. 2F.

Similar to setting various parameters of the printing process described above, the method can include setting various parameters of the curing process for the ink. Regardless of if the ink is cured after each layer or all in one curing step, the method can include setting the curing time for the ink (e.g., setting of a UV curing timer between each layer of material to obtain a suitable translucent effect), setting the curing intensity (e.g., UV intensity), setting the number of revolutions of curing in the curing process, and/or setting the rotation speed.

Figure 6:
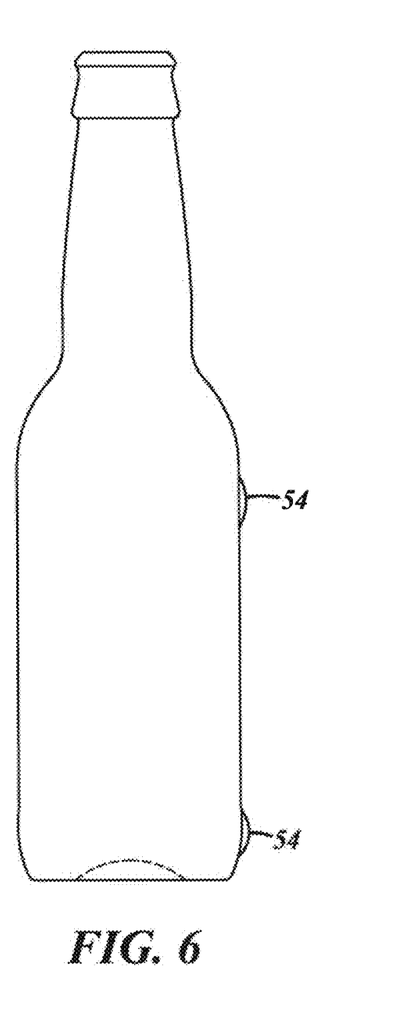
FIG. 6 depicts a container with 3D feature(s) being bumpers.
Figure 7:
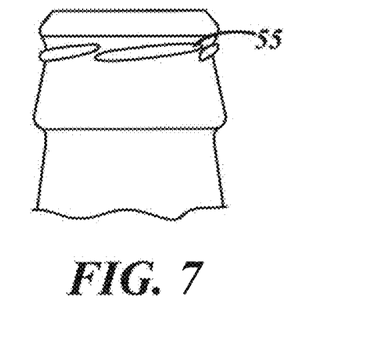
FIG. 7 depicts a container with a 3D feature being a plurality of thread.

While any number or type of feature can be formed having any type of surface contour or profile on the container 10, some exemplary features can include coatings (e.g., over part or all of the container), very narrowly defined protective coatings that are applied only onto the largest diameter portions of a container to protect such large diameter protrusions, a shoulder element, a bumper, a finish (e.g., lugs, threads), an insulated air volume (IAV) element (e.g., an open-cell UV-cured matrix comprising varnish with a plurality of voids formed therein), an orientation element (e.g., a deco-lug for orienting a label to a mold seam or feature on the container), an aesthetic element (e.g., a brand logo or a decorative feature like a star or other design), a grip, texture to improve hand gripping of the container, a handle, a label, one or more letters, an embossment, an undercut or negative draft feature such as a ledge or lug used to attach a secondary item such as a handle, and/or an image. The varnish could be applied over the closure system, extending from the glass surface below the container finish over the entire closure system to provide an air-tight seal and tamper evidence. Specifically, an IAV element includes an outer layer and an adjacent void or open space for trapping air that provides insulation to the container. It will be appreciated that the printer described herein can print not only ink to build up thickness, but also ink to form decorative images on the surface. FIG. 6 depicts surface contours 54 being bumpers to protect the glass container from scratches and/or cracks during use. FIG. 7 depicts surface contour 55 being a plurality of threads applied to a finish of the glass container. The plurality of threads is capable of releasably securing a cap to the mouth of the glass container.

Figure 8:
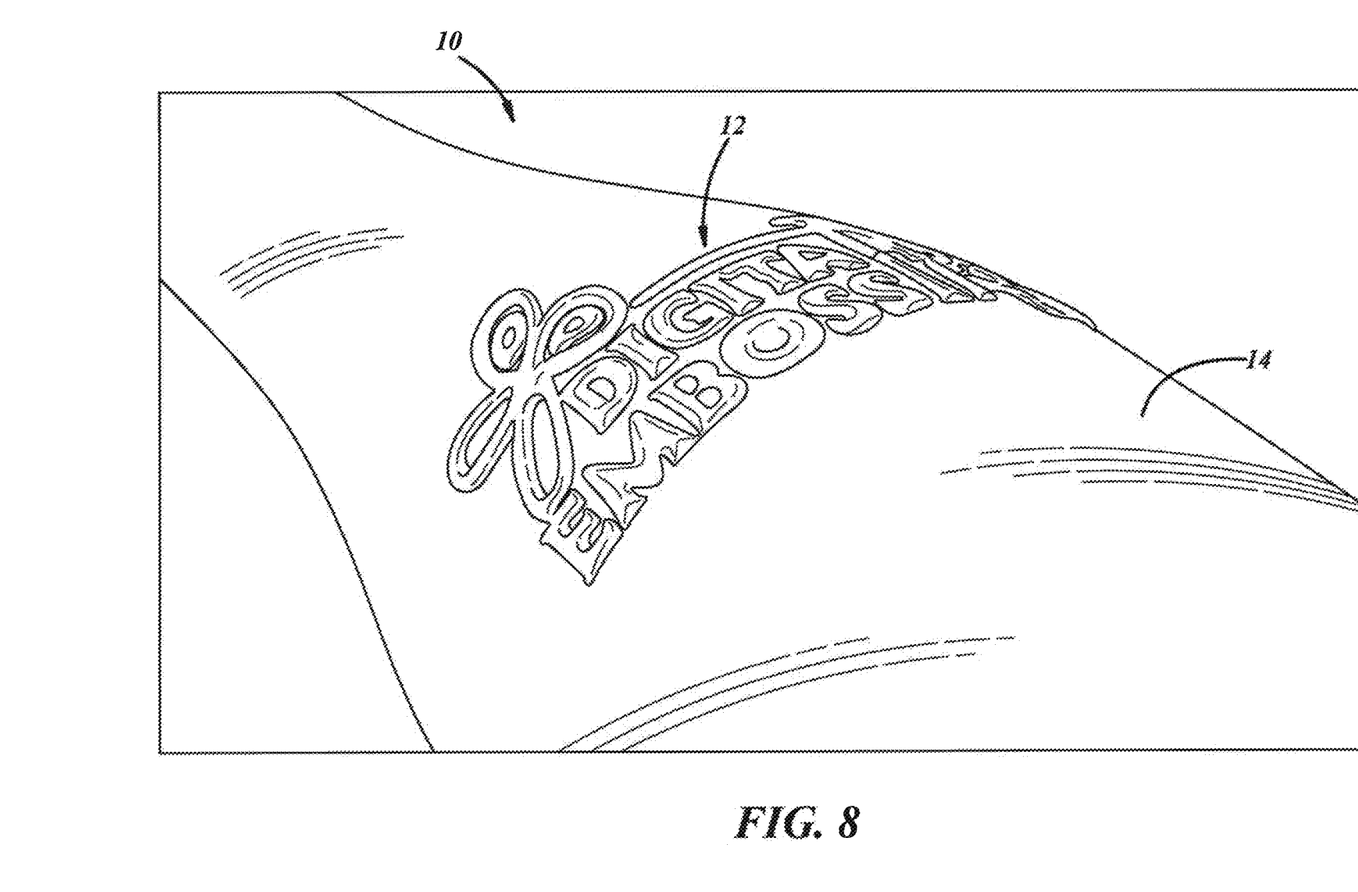
FIG. 8 depicts a container with 3D feature(s) including a combination of letters and symbols.

FIG. 8 depicts an illustration of a container having lettering and/or symbols applied thereon using one or more of the methods described herein. For example, the ink can be translucent, applied and cured in layers, and form a variety of letters or symbols, each having a variety of heights.

In some cases, the substrate or container can have locations that are free of ink. Returning to FIG. 1A, ink may be applied about or around a portion of the circumference C, but the container 10 may have portions about or around the circumference C that are free of ink. In this case, ink does not have to be applied about or around the entire circumference C in order to form the desired 3D feature 12. In the event that a plurality of layers of ink or varnish is applied, each of the layers is circumferentially interrupted or spaced so that each is not disposed about the entire circumference C.

After forming the desired 3D feature 12 having the desired surface contour, the printer can also apply an outermost layer of ink to protect the printed 3D feature 12. Any of the methods discussed herein can include a step of adding an outermost layer including a protective varnish (e.g., protective layer 13) to the surface of the glass container, the outermost layer being added only within the boundary of the 3D feature 12. This protective layer 13 can further protect the printed feature from scratches, cracks, handling, and other supply chain abrasion, especially in the case that the 3D feature 12 includes a decorative image printed thereon.

Because the 3D features added to the container are printed with an inkjet printer, there is no need for a mold to form the 3D feature on the container. The printer prints the ink in the desired location without the use of a mold, screen, or similar forming device. This has the advantage of increasing the shapes and geometries possible on the container. Additionally, 3D printing can eliminate the need to combine the formed container with a secondary component because a similar feature can be printed on the container's surface. This has the advantage of simplifying the manufacturing process (e.g., reducing the number of steps) and/or the number of separable pieces used to create the final container product.

Additionally, the cost of the substrates or containers produced with the 3D feature can be relatively cheaper than those produced with the use of a mold, screen printing, or similar process. This can allow production of relatively fewer containers with a specific 3D feature, and in a quicker time, when compared to containers produced with the use of the mold, screen printing, or similar process. Also, the 3D feature can be added after inspection so that any affect can be created without compromising the glass quality.

There has thus been disclosed an apparatus and methods of 3D printing various features on a substrate or container. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A method of printing a three-dimensional feature on a substrate having a surface, the method comprising the steps of:
   (a) identifying at least one location on the surface where the three-dimensional feature will be formed;
   (b) determining a height value of the three-dimensional feature at each location;
   (c) assigning a grayscale value to each location based on the height value;
   (d) applying ink to the surface in at least one layer according to the assigned grayscale value at each location, where the ink is curable in response to ultraviolet (UV) light; and
   (e) applying UV light to cure the ink, wherein steps (d) to (e) are repeated until the ink reaches the respective height value at each location to form the three-dimensional feature.

2. The method of claim 1, wherein the substrate includes a glass substrate, and the three-dimensional feature comprises a plurality of threads applied to the glass substrate, the plurality of threads capable of releasably securing a cap to a mouth of the glass substrate.

3. The method recited in claim 1, wherein the three-dimensional feature comprises a three dimensional structure including at least one of a shoulder element, a bumper, a lug, a thread, an insulated air volume (IAV) element, an orientation element, a grip, texture to improve hand gripping of the container, a handle, an embossment, or an undercut.

4. The method recited in claim 1, wherein the three-dimensional feature comprises an outermost layer including a protective varnish.

5. The method of claim 1, wherein the lightest grayscale value is assigned to the smallest height value and the darkest grayscale value is assigned to the largest height value.

6. The method of claim 1, wherein a portion of the surface is free of ink.

7. The method of claim 1, wherein the ink in step (d) is applied via a digital inkjet printer.

8. The method of claim 1, wherein the ink in step (d) is a varnish.

9. The method of claim 1, wherein the substrate is made of glass.

10. The method of claim 9, wherein the substrate is a glass container.

11. The method of claim 1, further comprising flame treating the surface before step (d).

12. The method of claim 1, further comprising:
setting at least one printing parameter wherein the at least one printing parameter is selected from at least one of a printing position with respect to the substrate and a printing speed wherein the at least one printing parameter is set before step (d); and
setting at least one curing parameter wherein the at least one curing parameter is selected from at least one of a curing time, curing intensity, number of revolutions of curing, and rotation speed wherein the at least one curing parameters is set before step (d).

13. A method of printing a three-dimensional (3D) feature on a glass substrate using an ultraviolet (UV)-curable varnish, comprising the steps of:
   (a) applying a layer of UV-curable varnish within a boundary of the 3D feature on a surface of the glass substrate;
   (b) curing the varnish layer by directing UV light toward the applied varnish layer;
   (c) based on an assigned grayscale value, applying one or more additional layers of UV-curable varnish within the boundary of the 3D feature on the surface of the glass substrate; and
   (d) curing the one or more additional layer of UV-curable varnish by directing UV light toward each additional varnish layer after it is applied, wherein the cured varnish layers form at least a portion of the 3D feature on the glass substrate.

14. The method of claim 13, wherein the glass substrate is a glass container that does not include a hot-end coating or a cold-end coating.

15. The method of claim 13, further comprising repeating steps (c) to (d) to form the 3D feature comprising a plurality of threads applied to the glass substrate, the plurality of threads capable of releasably securing a cap to a mouth of the glass substrate.

16. The method recited in claim 13, further comprising repeating steps (c) to (d) to form the 3D feature comprising a three-dimensional structure including at least one of a shoulder element, a bumper, a finish, an insulated air volume (IAV) element, an orientation element, a grip, texture to improve hand gripping of the container, a handle, an embossment, or an undercut.

17. The method recited in claim 13, further comprising repeating steps (c) to (d) to form the 3D feature including a shoulder element of the glass substrate, and wherein the shoulder element has a diameter that is greater than a diameter of a body of the glass substrate.

18. The method recited in claim 13, wherein the varnish layers in both steps (a) and (c) include a polymer.

19. The method of claim 13, further comprising step (e) adding an outermost layer including a protective varnish to the surface of the glass substrate, the outermost layer being added only within the boundary of the 3D feature.

20. The method of claim 13, wherein the method does not include use of a mold.

21. The method of claim 13, wherein the glass substrate has a circumference, and the varnish layers in steps (a) and (c) are each circumferentially interrupted.

22. A method of forming a lubricious glass container having a three-dimensional (3D) feature, comprising:
   (a) forming the glass container without a hot end coating;
   (b) annealing the glass container without container-to-container contact; and
   (c) printing at least one layer of varnish on at least a portion of the glass container to form the three-dimensional (3D) feature, where the at least one layer of varnish provides lubricity for the glass container.

23. The method of claim 22, wherein the varnish comprises a material additive including ethylene acrylic acid.

24. The method of claim 22, wherein the varnish includes at least one of a polymer, a monomer, a color, an additive, a finish, a photoinitiator, or a pigment.

25. The method of claim 22, wherein the at least one layer of varnish is printed on at least one contact area of the glass container.

26. The method of claim 1, wherein the substrate includes a glass container, wherein at least two three-dimensional features create at least two contact points, and wherein a portion of the glass container between the at least two three-dimensional features has a thickness less than a remaining portion of the glass container.

27. The method of claim 22, wherein no cold end coating is applied between steps (b) and (c).

\* \* \* \* \*

UNITED STATES PATENT AND TRADEMARK OFFICE
CERTIFICATE OF CORRECTION

PATENT NO. : 10,752,538 B1
APPLICATION NO. : 16/294414
DATED : August 25, 2020
INVENTOR(S) : Brian J. Chisholm et al.

Page 1 of 1

It is certified that error appears in the above-identified patent and that said Letters Patent is hereby corrected as shown below:

On the Title Page

Inventors: Item (72), after Eva delete "Misfud" and insert --Mifsud--.

Signed and Sealed this
Twentieth Day of October, 2020

Andrei Iancu
*Director of the United States Patent and Trademark Office*